Figure 1:
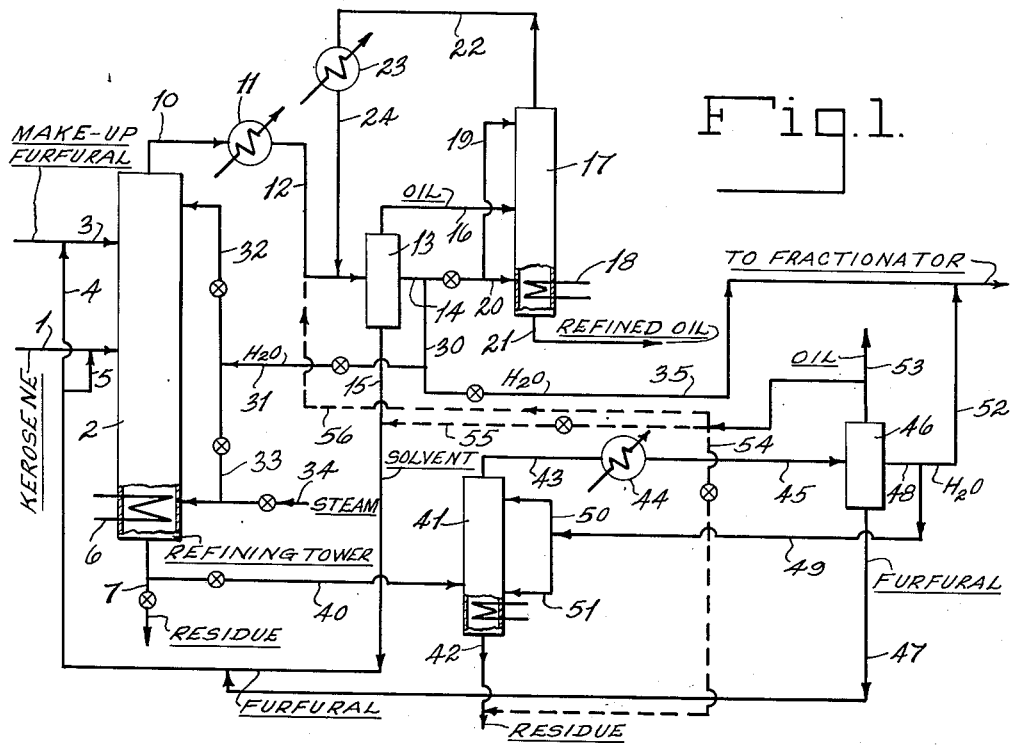

June 10, 1952

G. B. ARNOLD ET AL 2,600,184

REFINING KEROSENES AND GAS OIL BY
TERNARY AZEOTROPIC DISTILLATION

Filed Nov. 27, 1951

INVENTORS
GEORGE B. ARNOLD
LOUIS KOVACH

BY

ATTORNEYS

/ Patented June 10, 1952

2,600,184

UNITED STATES PATENT OFFICE 2,600,184

REFINING KEROSENES AND GAS OIL BY TERNARY AZEOTROPIC DISTILLATION

George B. Arnold, Fishkill, and Louis Kovach, Beacon, N. Y., assignors to The Texas Company, New York, N. Y., a corporation of Delaware Application November 27, 1951, Serial No. 258,418

6 Claims. (Cl. 202—42)

This invention relates to refining of oil involving azeotropic distillation with a solvent liquid which is at least partially miscible with water at ordinary temperatures and particularly relates to the treatment of oil containing at least a small proportion of constituents having true boiling points approximating the range of the solvent boiling temperature and below.

The present application is a continuation-in-part of our prior application, Serial No. 26,688, filed May 12, 1948, now patent No. 2,600,182 which claims an azeotropic distillation process for refining mineral oil, using furfural as the solvent.

In accordance with the invention, a low boiling oil, such as kerosene or a gas oil, is distilled with a selective solvent of the class consisting of phenol and aniline in the presence of water or another suitable azeotroping agent in a distilling zone under conditions effective to form a ternary azeotrope with the desired oil constituents of the feed oil. The distillate containing the azeotrope and a residual liquid containing residue oil are separately withdrawn from the distillation zone.

The invention has application to the defining of kerosenes and gas oils to remove aromatic constituents, unsaturated hydrocarbons, including naphthenes as well as olefins, and sulfur compounds. The resulting refined oils are thus more paraffinc in character and therefore more suitable as burning oils and diesel oils, as the case may be.

According to one mode of operation, the azeotropic distillate is condensed and cooled to approximately atmospheric temperature or to a temperature of about 100° F. and subjected to settling, so that separation into three liquid layers occurs. Thus when water is used as the azeotroping agent, the three layers so formed, upon settling, comprise an oil-rich liquid layer, a water-rich liquid layer, and a solvent-rich liquid layer. The solvent-rich liquid is recycled to the distillation zone, and residual solvent is recovered from the oil-rich and water-rich liquids leaving a solvent-free refined oil as will be described later in more detail.

According to another modification of the process of the invention, the azeotropic distillate is condensed, either without substantial reduction in temperature or to some intermediate temperature at which two phase separation occurs. The hot condensate so obtained is subjected to settling in a primary settling zone wherein displacement of oil from water occurs. The displaced oil, retaining a large amount of solvent, is separately subjected to settling in a secondary settling zone at a temperature substantially below the temperature of miscibility of its constituents so as to as effect recovery of the solvent in concentrated form suitable for recycling to the distillation zone. Residual solvent is recovered from this secondary oil layer and also from the primary water-rich liquid by distillation as will be discussed later.

A further modification of the process of the invention involves carrying out the primary azeotropic distillation so as to form a residual liquid which comprises a solution of residue oil in solvent. This residual liquid solution is subjected to azeotropic distillation to effect recovery of solvent and produce substantially solvent-free residue oil in a manner which will be described in more detail.

In Patent No. 2,534,382 dated Dec. 19, 1950, to William E. Skelton and George B. Arnold, one of the present joint applicants, there is disclosed a process for refining light oils which involves conventional liquid-liquid solvent extraction of the oil coupled with azeotropic distillation of the resulting raffinate and extract phase mixtures for recovery of the solvent. In these operations, however, azeotropic distillation is utilized only to effect recovery of the solvent from either the raffinate or extract oil or both. The present invention distinguishes therefrom by employing azeotropic distillation in effecting the initial separation of the feed oil into refined oil and residue analogous to raffinate and extract phases of solvent refining. The present invention also distinguishes from azeotropic-extractive distillations as heretofore practiced by conducting the operation in the presence of a sufficient amount of water or other agent so as to form a ternary azeotrope rather than a binary azeotrope with all of the raffinate phase discharged from the primary separation zone.

Ternary azeotropic distillation involves considerably more than merely adding water to a binary distillation. Binary azeotropes and ternary azeotropes have different properties and different limitations.

Binary azeotropes of a solvent and hydrocarbons boiling above the boiling point of the solvent all boil a few degrees lower than the true boiling point of the solvent. Binary azeotropes of a solvent and hydrocarbons boiling below or in a range approximating the boiling point of the solvent, boil over a range a few degrees below the true boiling points of the hydrocarbons. Ternary azeotropes of these hydrocarbons with water and a solvent such as phenol or aniline, on the other hand, boil below the boiling point of water in the range of 208–212° F., regardless of the boiling point of the hydrocarbons boiling above 212° F.

Separation of hydrocarbon mixtures by binary azeotropic distillation is in general limited to fractions of relatively narrow boiling range. Ternary azeotropic distillation may be applied to hydrocarbon fractions of relatively wide boiling range. Ternary azeotropic distillation using water permits the separation of hydrocarbon mixtures whose boiling range is above the boiling point of water, and which may include the boiling point of the solvent.

In order to describe the invention, reference will now be made to Figures 1 and 2 of the accompanying drawing. The drawing sets forth a method of flow which is particularly suitable for the refining of kerosene using phenol or aniline as a selective solvent and water to form the ternary azeotropes.

As indicated in the drawing, kerosene is conducted from a source not shown through a pipe 1 and introduced to about the mid-point of a distillation column. The solvent is supplied either through pipe 3 leading to the upper portion of the column or through pipes 4 and 5 into the intermediate portion of the tower along with the feed oil. The solvent is introduced to the column in the proportion of about one-half to three volumes per volume of kerosene, and, preferably, in the proportion of about one volume per volume of kerosene.

The column is provided with a reboiler 6 to provide heat for distillation. It will be understood that provision can be made for preheating the entering solvent and oil by suitable heat exchange or direct heating, such provision not being indicated in the drawing.

Column 2 can be operated under atmospheric or elevated pressures and can also be operated so that the residual liquid drawn off from the bottom of the tower consists of solvent-free or substantially solvent-free residue oil which can be discharged through pipe 7.

When so operated as to produce solvent-free residue oil, the temperature at the top of the column 2 is maintained at about 300° F. when phenol is used as the solvent, or about 310° F. when aniline is employed, while solvent and kerosene are introduced in the approximate relative proportions of one to one. Water is supplied in the proportion of about one-eighth to one of solvent plus kerosene. Under such conditions, the distillate produced from the column will consist of ternary azeotropes or refined oil hydrocarbons, solvent and water, the refined oil amounting to approximately 50–80% by volume of the feed oil. This distillate is discharged through pipe 10 and a condenser cooler 11. The resulting cooled condensate at a temperature of about 60–90° F. in the case of a phenol solvent, or about 100–150° F. in the case of aniline, is conducted through pipe 12 to a settling vessel 13.

In the vessel 13, separation into an oil-rich liquid layer, water-rich liquid layer, and a solvent-rich liquid layer occurs. The solvent-rich liquid is continuously drawn off through pipe 15 for return to the column 2. This recycled solvent is saturated with water, and will thus contain about 8–12% water by volume in the case of phenol and 4–15% in the case of aniline. It may also retain a small amount of residual oil—approximately 5–20% by volume for phenol and 5–15% for aniline.

The refined oil layer containing about 10–20% phenol or 6–11% aniline, as the case may be, is continuously drawn off through pipe 16 to a secondary column 17 wherein it is subjected to azeotropic distillation in the presence of water. This column is also provided with a reboiler 18, and provision is made for supplying water reflux to the top of the column. Thus a portion of the previously mentioned water-rich liquid drawn off through pipe 14 from the settler 13 is conducted through branch pipe 19 to supply this reflux liquid. If desired, a further portion of this water may be injected from branch pipe 20 into the lower portion of the column 17 to provide a stripping action to aid in distilling residual solvent from the raffinate oil. Solvent-free refined oil is discharged through pipe 21.

The resulting distillate comprising water, oil and residual solvent is removed through pipe 22, condenser 23 and pipe 24 to the previously mentioned settler 13.

As indicated, a portion of the water-rich liquid from pipe 14 is diverted through pipe 30 and branch pipe 31 communicating with pipes 32 and 33. Pipe 32 thus permits supplying some of this water as reflux to the primary column 2, while pipe 33 permits supplying some of it to the lower portion thereof for stripping purposes. If desired, provision may be made for introducing open steam from a source not shown through pipe 34.

The surplus water not recycled to columns 2 and 17 is discharged through pipe 35. Since it still retains a small amount of residual solvent, it can be passed to a suitable fractionator for the recovery of this residual solvent.

By way of example, when operating in the manner just described, a kerosene feed oil having the following physical characteristics is charged to the middle of the column 2:

| | |
|---|---|
| Gravity, A. P. I. | 40.4 |
| Aniline point | 130.5 |
| Sulfur weight, per cent | 0.19 |
| Refractive index | 1.4551 |
| Color, A. S. T. M. | 2½ |
| Distillation, A. S. T. M.: | |
| I. B. P. | 360 |
| 10% | 384 |
| 50% | 401 |
| 90% | 440 |
| End point | 494 |

The solvent is charged to the column at the rate of 1.0 volume solvent per volume of kerosene per hour. Water is injected at the top of the column at the rate of 0.1 volume, and at the bottom of the column at the rate of 0.25 volume per volume of kerosene per hour.

Employing phenol as the solvent, the temperature at the top of the tower is maintained at about 300° F. and the pressure on the system is maintained at approximately atmospheric. The resulting distillate is condensed, cooled and subjected to separation at approximately 70° F. The resulting oil-rich phase amounts to about 0.65 volume, the water-rich phase about 0.35 volume and the phenol-rich phase about 1.00 volume per volume of kerosene charged. The residue oil drawn off from the bottom of the column amounts to about 0.40 volume per volume of kerosene charged.

On the other hand, with aniline as a solvent, and with the system pressure approximately atmospheric, the tower top temperature is preferably maintained about 310° F., and the distillate is condensed, cooled and separated at about 100° F. In this case, the resulting oil-rich phase amounts to about 0.64 volume, the water-rich phase about 0.38 volume and the aniline-rich phase about 0.93 volume, all per volume of kerosene charged, whereas the residue drawn off from the bottom of the column amounts to about 0.40 volume, on the same basis.

In either case, the oil recovered from the distillate oil-rich phase possesses the following approximate characteristics:

| | |
|---|---|
| Gravity, A. P. I. | 44.0 |
| Aniline point | 143.6 |
| Sulfur weight, per cent | 0.077 |
| Refractive index | 1.4445 |
| Color, Saybolt | +30 |

In the event that the primary column 2 is operated so that the residual liquid removed from the bottom thereof comprises a solution of residue oil in solvent, this residual liquid stream is conducted through pipe 40 to a distilling column 41 substantially similar to those previously described, and wherein the residual liquid is subjected to ternary azeotropic distillation in a substantially similar manner to that conducted in column 17, and so as to produce solvent-free residue oil. The latter is discharged through pipe 42.

The resulting distillate is removed through pipe 43, condenser cooler 44 and pipe 45 to a settler 46. In this settler, separation into three liquid layers occurs. The solvent-rich liquid is withdrawn from the bottom of settler 46 through pipe 47 and recycled to the primary column 2.

The water-rich liquid is drawn off through pipe 48, part being diverted through pipe 49 for recycling to column 41 by means of branch pipes 50 and 51. The non-recycled portion is discharged through pipe 52. It can be treated along with that discharged through pipe 35 in a final fractionator to recover residual solvent.

The oil-rich layer collecting in settler 46 may be discharged as such through pipe 53 in which case it can be conducted through pipe 54 to the residue oil stream discharged through pipe 42. It can also be recycled to the system, for example, by passage through pipe 55 communicating with pipe 15 or by passage through pipe 56 to be combined with refined oil in pipe 12.

Figure 2:
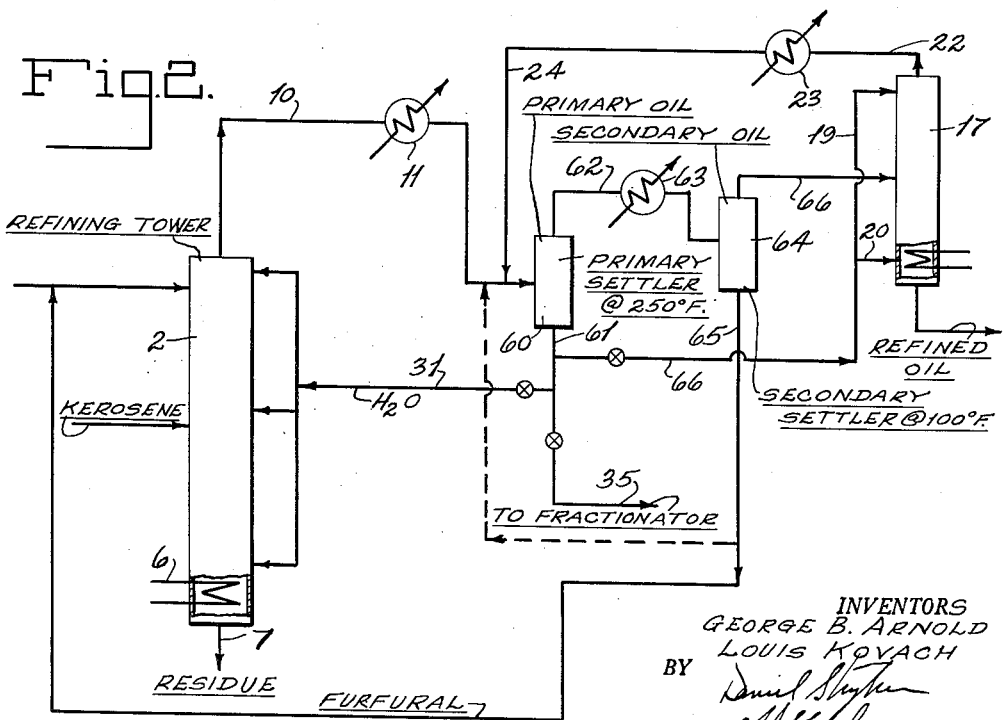

Figure 2 refers to the modification wherein the distillate from the primary column is subjected to staged settling at different temperatures. In this operation, the distillate drawn off through pipe 10 is subjected to condensing in condenser 11 to form a hot condensate, preferably at a temperature of about 130° F. using phenol, and about 250° F. with aniline as the solvent, and such that water separates from the oil-solvent mixture.

Therefore, when phenol is used as the solvent, the hot condensate is passed to a primary settler 60 maintained at about 130° F. and under sufficient pressure to maintain liquid phase conditions therein. In this settler the mixture separates into a primary oil layer comprising about equal parts by volume of oil and phenol and about 10% of water and a lower or aqueous layer comprising about 70% water, 20% phenol and 10% oil. The temperature in the primary settler is chosen so as to effect binary phase separation.

The aqueous layer is drawn off through a pipe 61, and a substantial portion thereof is diverted through pipe 31 for return to the refining tower 2 as has been described in connection with Figure 1.

The primary oil layer is drawn off from the upper portion of the settler 60 through a pipe 62 and passed through a cooler 63 wherein it is cooled to about 60–90° F., such that separation into two layers occurs in a settler 64. The upper or secondary oil layer comprises about 87% oil, 12% phenol and about 1% of water. The bottom or solvent layer comprises about 80% phenol, and about 12% oil, and about 8% water. The bottom or phenol-rich layer is drawn off through pipe 65 and returned to the refining tower 2 as recycled solvent.

The secondary oil layer is drawn off from the settler 64 through a pipe 66 to the distilling column 17 which has been described in connection with Figure 1. As in the case of Figure 1, the refined oil is drawn off from the bottom of the column 17 while the small amount of residual solvent recovered as distillate therefrom is conducted through pipe 22, cooler 23 and pipe 24 for return to the primary settler 60.

A portion of the aqueous layer from the bottom of the primary settler 60 is conducted through pipe 66 for introduction to the tower 17 in a manner similar to that already described in connection with Figure 1. Likewise, the non-recycled or surplus portion of the aqueous layer from the primary settler 60 is drawn off through pipe 35 to a fractionator for recovery of the small amount of residual solvent contained therein.

When aniline is substituted for phenol in the foregoing embodiment, it is preferred to operate condenser 11 and the primary settler 60 at a temperature of about 250–300° F., in which case the mixture separates in the settler into a primary oil-aniline layer and lower aqueous layer. The primary layer comprises about 60 parts of aniline and about 40 parts of oil with only a trace of water, and a lower water-rich layer contains about 75% of water, about 15% of aniline and about 5% of oil. So also, the separation in the secondary settler 64 is preferably effected at a temperature of about 100–120° F. In this case, the upper oil layer which separates in the settler secondary 64 comprises about 90% oil, 10% aniline with only a trace of water, whereas the bottom or solvent-rich layer comprises about 88% aniline, about 8% oil and about 4% water.

The extractive-azeotropic distillation operation in the refining tower 2 may be carried out under super-atmospheric pressures; for example, it may be carried out under pressures of ten to twenty-five pounds per square inch gage or sufficient to provide the pressure necessary to maintain liquid phase conditions in the staged settling zones described in Figure 2.

While mention has been made of subjecting the oil-rich liquid streams from the settling vessel 13 to azeotropic distillation, nevertheless, it is contemplated that other procedures may be employed for recovering the residual solvent from the refined oil, such as water washing. The resulting wash water containing extracted solvent should then be treated in a separate fractionator for concentration of the solvent, or contacted with a stream of feed oil under conditions such that the feed oil would extract the solvent from the water.

In operation the primary azeotropic refining column 2 is operated under conditions to permit maintaining the highest top tower temperature compatible with good refining action. The solvent recovery columns 17 and 41 are operated at the highest temperature compatible with a reasonable amount of oil in the distillate not in excess of about 30%.

Although treatment of kerosene has been specifically referred to in connection with the drawing, it should be understood that the process is applicable to the treatment of other low boiling oils, including gas oils and oils of either virgin or cracked type. In general, the invention has application to the treatment of hydrocarbon mixtures having an A. S. T. M. boiling range of about 275–600°. It is also contemplated that it has application to the treatment of oils derived from animal and vegetable sources. Specific conditions of temperature and solvent dosage may vary from those specifically mentioned, depending upon the character of the feed oil undergoing treatment and the degree of fractional separation desired.

Reference herein to constituents or hydrocarbons having true boiling points approximating the boiling point of the solvent, or the like, means oil constituents whose boiling points are sufficiently close to that of the solvent so that they are not readily separable therefrom by ordinary fractionation. This, accordingly, includes, for example, fractions boiling as high as 10–20° F. above the solvent boiling range.

Obviously many modifications and variations of the invention as above set forth may be made without departing from the spirit and scope thereof, and, therefore, only such limitations should be imposed as are indicated in the appended claims.

We claim:

1. In the refining of a mineral feed oil boiling within the range about 275 to 600° F. containing both saturated and unsaturated constituents, said saturated constituents being capable of entering into ternary azeotrope formation with a polar solvent liquid of the class consisting of phenol and aniline in the presence of water, to separate therefrom a fraction enriched in said saturated constituents by azeotropic distillation with said polar solvent liquid, the method comprising continuously passing fresh feed oil and said polar solvent to a primary distillation zone, subjecting said oil to azeotropic distillation therein in the presence of water and said solvent, supplying water and said solvent to said primary distillation zone in amounts sufficient to form a distillate consisting essentially of a ternary azeotropic mixture of water, solvent and saturated constituents of oil, and containing at least about 50% of the feed oil entering the extraction zone, and said azeotropic mixture boiling below the boiling temperature of water under the pressure prevailing in said zone, continuously and separately withdrawing from said zone said distillate and a residual liquid containing unsaturated constituents of the feed oil, condensing said distillate, subjecting resulting condensate to stratification in a settling zone at a temperature in the range about 60 to 150° F., forming in said settling zone a water-rich liquid layer, an oil-rich liquid layer and a solvent-rich liquid layer, recycling at least a portion of said solvent-rich liquid to said primary distillation zone, passing said oil-rich liquid to a secondary distillation zone, injecting a portion of said water-rich liquid as reflux to said secondary distillation zone, subjecting the oil-rich liquid to azeotropic distillation therein to remove aqueous solvent as a distillate therefrom, recycling said last mentioned distillate to the aforesaid settling zone and withdrawing substantially solvent-free oil as residual liquid from said secondary distillation zone.

2. The method according to claim 1 in which another portion of said water-rich liquid is passed to the lower section of said secondary distillation zone.

3. In the refining of a feed oil of the class of kerosene and gas oil containing paraffinic and relatively non-paraffinic constituents to separate therefrom a fraction enriched in paraffinic constituents by azeotropic distillation in the presence of water and a polar solvent liquid of the class consisting of phenol and aniline, the method comprising continously passing fresh feed oil to a primary distillation zone, subjecting said oil to azeotropic distillation therein in the presence of water and said solvent, supplying said water and solvent to said zone in amounts sufficient to form a distillate consisting essentially of a ternary azeotropic mixture of water, solvent and paraffinic constituents of the oil and containing at least the major portion of the paraffinic constituents of the feed oil, separately withdrawing from said zone said distillate and a residual liquid containing non-paraffinic constituents of the feed oil, condensing said distillate, subjecting the condensate to stratification in a settling zone at a temperature in the range about 60 to 150° F., forming in said settling zone water-rich, oil-rich and solvent-rich liquid layers, respectively, recycling at least a portion of said solvent-rich liquid to the primary distillation zone, passing said oil-rich liquid to a secondary distillation zone, injecting a portion of said water-rich liquid as reflux to said secondary distillation zone, subjecting the oil-rich liquid to azeotropic distillation therein to remove aqueous solvent as a distillate therefrom, recycling said last mentioned distillate to the aforesaid settling zone and withdrawing substantially solvent free oil as residual liquid from said secondary distillation zone.

4. The method according to claim 3 in which another portion of said water-rich liquid is passed to the lower portion of said secondary distillation zone.

5. The method according to claim 1 wherein the polar solvent liquid is phenol.

6. The method according to claim 1 wherein the polar solvent liquid is aniline.

GEORGE B. ARNOLD.
LOUIS KOVACH.

REFERENCES CITED

The following references are of record in the file of this patent:

UNITED STATES PATENTS

| Number | Name | Date |
|---|---|---|
| 2,177,183 | Kraft et al. | Oct. 14, 1939 |
| 2,290,636 | Deanesly | July 21, 1942 |
| 2,358,128 | Lake | Sept. 12, 1944 |
| 2,361,493 | Patterson | Oct. 31, 1944 |
| 2,368,597 | Morris et al. | Jan. 30, 1945 |
| 2,437,649 | Milner | Mar. 9, 1948 |
| 2,459,433 | Johnson et al. | Jan. 18, 1949 |
| 2,475,147 | Manley | July 5, 1949 |
| 2,563,344 | Leffert et al. | Aug. 7, 1951 |